US008807047B2

(12) United States Patent
Donnelly

(10) Patent No.: US 8,807,047 B2
(45) Date of Patent: Aug. 19, 2014

(54) INDUSTRIAL LOCOMOTIVE CONSTRUCTION

(71) Applicant: Frank Wegner Donnelly, North Vancouver (CA)

(72) Inventor: Frank Wegner Donnelly, North Vancouver (CA)

(*) Notice: Subject to any disclaimer, the term of this patent is extended or adjusted under 35 U.S.C. 154(b) by 0 days.

(21) Appl. No.: 14/028,184

(22) Filed: Sep. 16, 2013

(65) Prior Publication Data

US 2014/0013993 A1    Jan. 16, 2014

Related U.S. Application Data

(62) Division of application No. 13/016,553, filed on Jan. 28, 2011, now Pat. No. 8,561,545.

(60) Provisional application No. 61/299,096, filed on Jan. 28, 2010.

(51) Int. Cl.
*B61C 17/00* (2006.01)

(52) U.S. Cl.
USPC ............................ 105/26.05; 105/35; 105/136

(58) Field of Classification Search
USPC ........................ 105/26.05, 166, 167, 188, 195
See application file for complete search history.

(56) References Cited

U.S. PATENT DOCUMENTS

| 1,568,197 | A | * | 1/1926 | Stumpf | 105/48.2 |
|---|---|---|---|---|---|
| 1,754,995 | A | * | 4/1930 | Galligan | 446/447 |
| 3,288,083 | A | * | 11/1966 | Jones | 105/34.1 |
| 3,529,552 | A | * | 9/1970 | Kunz et al. | 105/362 |
| 3,693,553 | A | * | 9/1972 | Lich | 105/136 |
| 4,040,360 | A | * | 8/1977 | Jackson | 105/136 |
| 4,040,361 | A | * | 8/1977 | Jackson | 105/136 |
| 4,043,272 | A | * | 8/1977 | Jones et al. | 105/136 |
| 4,088,080 | A | * | 5/1978 | Jackson | 105/136 |
| 4,311,098 | A | * | 1/1982 | Irwin | 105/226 |
| 4,440,094 | A | * | 4/1984 | Levy | 105/166 |
| 4,485,743 | A | * | 12/1984 | Roush et al. | 105/176 |
| 4,793,047 | A | * | 12/1988 | Curtis et al. | 29/407.08 |
| 5,099,767 | A | * | 3/1992 | Gunter et al. | 105/453 |
| 5,613,444 | A | * | 3/1997 | Ahmadian et al. | 105/166 |
| 5,746,135 | A | * | 5/1998 | Ahmadian et al. | 105/196 |
| 6,006,674 | A | * | 12/1999 | Ahmadian et al. | 105/220 |

(Continued)

OTHER PUBLICATIONS

Eudaly et al., Santa Fe Rails: vol. 1, White River Productions, 1996, Kansas City, MO, ISBN 0-89745-987-3, pp. 1-144.

(Continued)

*Primary Examiner* — Jason C Smith
(74) *Attorney, Agent, or Firm* — Sheridan Ross P.C.

(57) ABSTRACT

A method is disclosed for constructing a locomotive, in part, from serviceable used parts from one or more other locomotives. The principal part that is used in this new locomotive configuration is a single, used locomotive truck assembly. The various embodiments and configurations of the present invention are directed generally to a purpose-built locomotive that incorporates parts from other locomotives in a unique way. The present invention can be summarized as a method creating a simple locomotive that is well adapted to switching and spotting functions that shares commonality with other larger locomotives both in terms of components and design. Because this new piece equipment is built in part from a plentiful supply of under-valued surplus components, it will be economical to construct and maintain. The locomotive may also include a self-elevating system so that the truck assembly can be accessed or removed rapidly for maintenance or repairs.

18 Claims, 15 Drawing Sheets

(56) References Cited

U.S. PATENT DOCUMENTS

| | | | |
|---|---|---|---|
| 6,401,627 B1* | 6/2002 | Fehrenbach et al. | 105/182.1 |
| 6,408,766 B1* | 6/2002 | McLaughlin et al. | 105/231 |
| 8,313,111 B2* | 11/2012 | Ahuja et al. | 280/6.159 |
| 8,561,545 B2 | 10/2013 | Donnelly | |
| 2011/0203480 A1* | 8/2011 | Donnelly | 105/35 |

OTHER PUBLICATIONS

Kratville, William, ed., The Car and Locomotive Encyclopedia of American Practices, Sixth Edition, 1997, Simmons-Boardman Books, p. 537.

Railcar Movers Industry Online website, www.railcarmover.com, Apr. 10-11, 2009, 10 pages.

Reed, Critters, Dinkys & Centercabs: The identification guide for small American gas and Diesel locomotives, 2000, ISBN 0-9647221-2-7, pp. 1-192.

Reed, ed., Comprehensive Guide to Industrial Locomotives, Third Edition, 2002, ISBN 0-9647221-3-5, pp. 1-107.

Thomson "Image of Milwaukee Road CMStP&P Electric Shop Switcher X3800," May 2007, retrieved from (www.flickriver.com/photos/hunter1828/502911146/) 4 pages.

SDP45 "Image of Milwaukee Road Deer lodge Shop goat X3800," Jul. 2008, retrieved from (www.flickr.com/photos/sdp45/2720859973) 2 pages.

Official Action for U.S. Appl. No. 13/016,553, mailed Jan. 25, 2013 7 pages.

Notice of Allowance for U.S. Appl. No. 13/016,553, mailed Jun. 11, 2013 11 pages.

* cited by examiner

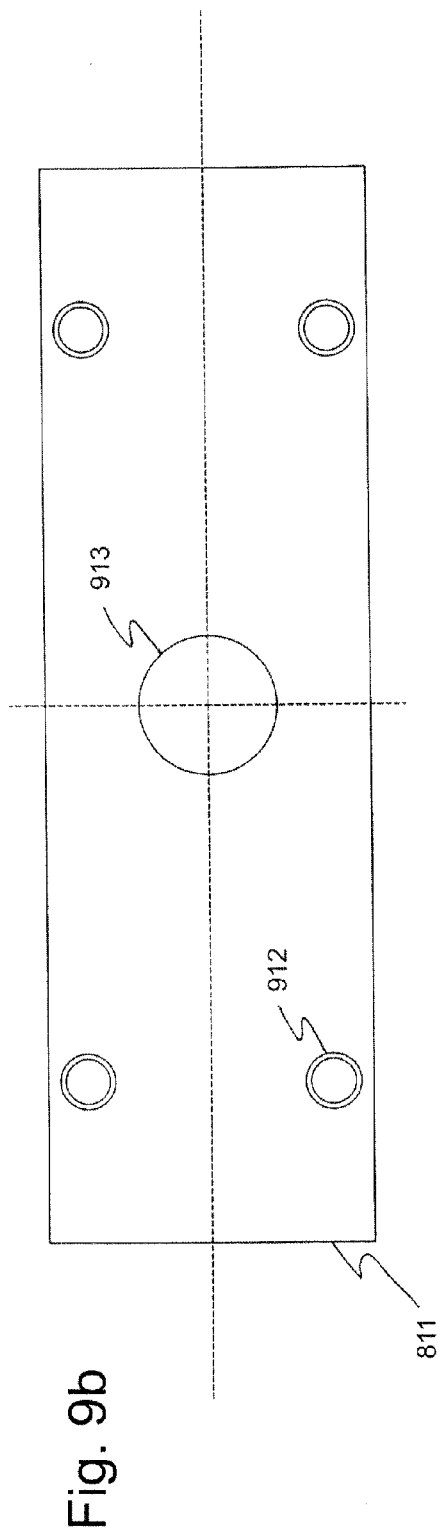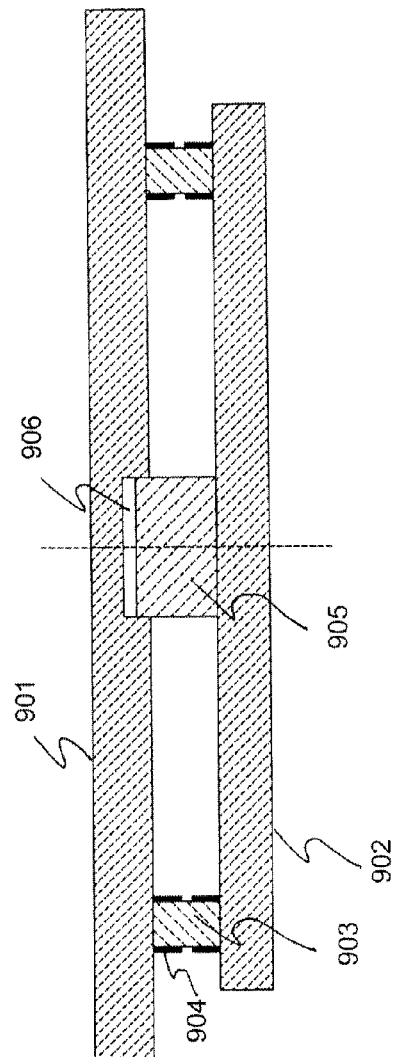
Fig. 9b
Fig. 9a
Figure 9

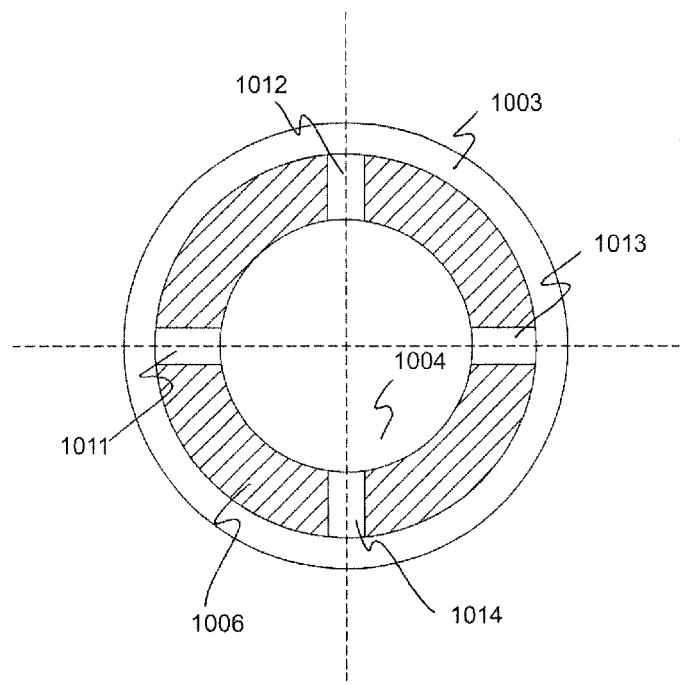
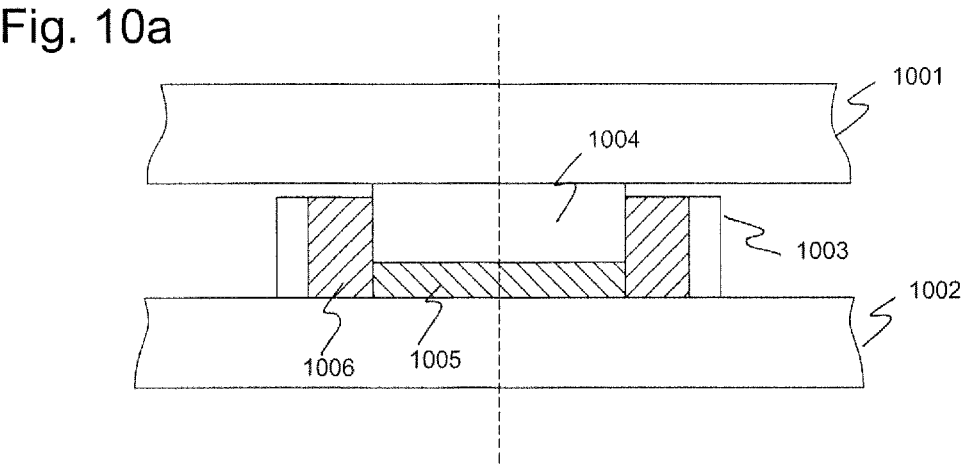
Figure 10

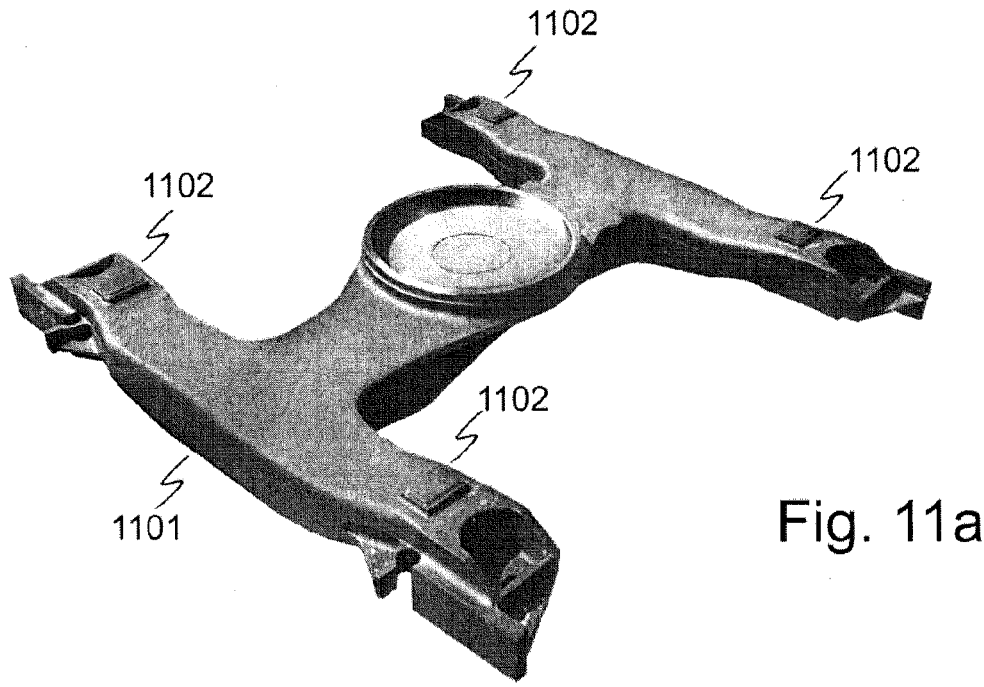
Fig. 11a
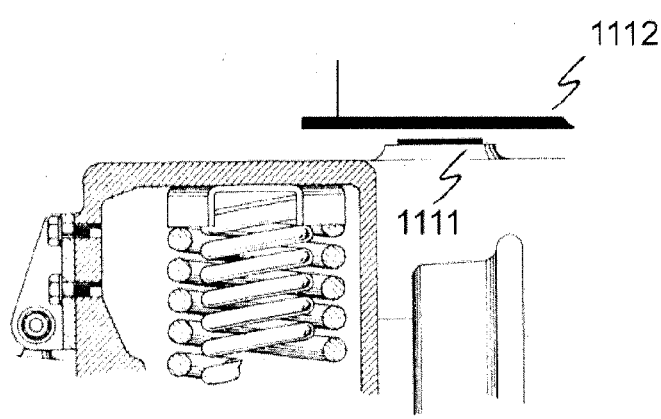
Fig. 11b
Figure 11 (Prior Art)

INDUSTRIAL LOCOMOTIVE CONSTRUCTION

CROSS REFERENCE TO RELATED APPLICATION

The present application is a divisional of co-pending U.S. patent application Ser. No. 13/016,553 entitled "Industrial Locomotive Construction", filed Jan. 28, 2011, which claims the benefits, under 35 U.S.C. §119(e), of U.S. Provisional Application Ser. No. 61/299,096 entitled "Industrial Locomotive Construction", filed Jan. 28, 2010, each of which is incorporated herein by this reference in its entirety.

FIELD

The present invention relates to a method of constructing a locomotive.

BACKGROUND

Small industrial locomotives are typically used to move one to several rail cars in and around a factory, a mine, a small rail yard, a shipping hub and the like. These are typically small locomotives with two or more axles attached directly to the locomotive frame or by means of swiveling truck assemblies that are attached to the locomotive car body. An example of a small industrial locomotive is shown in FIG. 1.

For larger industrial applications, used or new switcher locomotives or used line-haul locomotives are often employed. An example of a switcher locomotive is shown in FIG. 2. An example of a line-haul locomotive is shown in FIG. 3.

Railcar movers are another alternative for moving rail cars about a rail yard. These are road-rail vehicles capable of traveling on both roads and rail tracks. They are fitted with couplers for moving small numbers of railroad cars around in a rail siding or small yard.

Railcar movers are typically less expensive than switcher locomotives and more productive than manual moving of cars. They are more versatile since they can travel on road wheels to the cars they need to move, instead of requiring clear track.

There are basically two types of mobile railcar movers available. The first type developed in the late forties utilizes steel driven rail wheels for motive effort on rail track. Off road movement is developed by engaging rubber tires with drive sprocket extensions on the rail wheels. The second type developed in the early seventies generates its motive effort on the rail through rubber tires. Off road movement uses the same drive system and rubber tires.

The tasks of marshaling of railcars in a rail yard or spotting railcars in an industrial facility are usually done by switcher locomotives, industrial locomotives or railcar movers. The problem that has developed in relatively recent times is the shortage of suitable equipment to do switching and spotting functions. In the past, larger locomotives that became obsolete and surplus to the railroads for line-haul service could be reused in lighter duty industrial and switcher service. Nowadays, more often than not, this is no longer possible. Today because of their sheer size and power, currently available surplus line-haul locomotives are unsuitable for any service other than that for which they were originally designed.

Surplus four-axle locomotives with two-axle trucks from line haul service are the type of locomotive that are sought after for switching and industrial applications and therefore have an intrinsic value greater than the larger six-axle locomotives with their pair of three-axle trucks. The present situation is that the majority of available surplus line-haul locomotives have been replaced by newer locomotives and are the six-axle type which cannot be economically converted for the switching and industrial service and are often discarded as scrap.

There is an on-going demand for new and replacement switcher and industrial locomotives that is now being mostly met by the reworking of older locomotives from limited sources, by the manufacturing of new industrial locomotives that incorporate reclaimed parts from limited sources, and by railcar movers.

SUMMARY

These and other needs are addressed by the present invention. The various embodiments and configurations of the present invention are directed generally to a purpose-built locomotive that can incorporate parts from other locomotives in a unique way.

In one embodiment, a locomotive is provided that includes:
(a) a locomotive car body;
(b) a prime power source; and
(c) no more than one truck assembly operatively engaging the locomotive car body.

The truck assembly includes three or more pairs of driving axles. Each driving axle engages a plurality of wheels. Traction motors are in electrical communication with the prime power source and axles to apply tractive effort.

The locomotive car body typically includes an integral frame, a cab, and hood covering the prime power source. The truck assembly is a three-axle truck assembly. The truck assembly includes a truck frame, lateral and vertical shock absorbers, and a brake assembly.

In one configuration, the locomotive car body is substantially rigidly attached to the truck assembly to substantially inhibit the locomotive car body from moving and/or rotating relative to the truck assembly.

In a further configuration, a bolster engages and connects the locomotive car body and the truck assembly. The bolster inhibits rotational movement of the locomotive car body relative to the truck assembly. The bolster is free of a circular plate to engage the locomotive car body.

In a further configuration, the locomotive has a connection system for connecting the locomotive car body to the truck assembly. The connection system includes a plurality of sets of a spring member and a spring cylinder to inhibit lateral motion by the respective spring member and a central cylinder to carry at least most of the weight of the locomotive car body. The central cylinder is attached to only one of the truck assembly and locomotive car body, and the central cylinder is free to move vertically in response to movement of a spring member.

In a further configuration, the locomotive has a connection system for connecting the locomotive car body to the truck assembly. The connection system comprises an annular cylinder rigidly attached to one of the locomotive car body and truck assembly, a central cylinder rigidly attached to the other of the locomotive car body and truck assembly, and an elastically deformable material separating the annular cylinder from the central cylinder. The locomotive car frame is free to move laterally and/or rotate relative to the truck assembly.

In a further configuration, the locomotive has a connection system for connecting the locomotive car body to the truck assembly. The connection system includes a plurality of first side bearing plates positioned at either side of the locomotive and attached to the locomotive car body and second side bearing plates positioned adjacent to the first side bearing plates and attached to the truck assembly. The first and second side bearing plates contact one another and restrict side-to-side rocking, tilting, and/or swiveling of the locomotive car body relative to the truck assembly.

The connection system further includes first end bearing plates positioned at either end of the locomotive and attached to the locomotive car body and second end bearing plates positioned adjacent to the first end bearing plates and attached to the truck assembly. The first and second end bearing plates contact one another and restrict end-to-end rocking, tilting, and/or swiveling of the locomotive car body relative to the truck assembly.

In a further configuration, the locomotive car body is operatively engaged with the truck assembly by a bolsterless attachment system.

In a further configuration, the locomotive includes a self-elevating system that comprises a plurality of hydraulic cylinders and mechanical screw jacks that extend and retract. In a first mode, the members are retracted to permit movement of the locomotive and, in a second mode, the members are extended to lift the locomotive car body above the truck assembly to permit access to or removal of the truck assembly.

In a further configuration, the locomotive may be a cabless locomotive and may independently operable by an operator: on foot; in a vehicle not connected to the train being pulled by the cabless locomotive; or in a building or in any other remote location in communication with the locomotive. The locomotive may utilize any number of remote control techniques, such as for example, a belt controller unit worn by the operator, a radio telemetry unit, a wireless unit such as a computer or cellular phone, an optical link or any other commonly known means of communication.

The locomotive can have a tractive effort in the range of about 25,000 to about 65,000 pounds and/or a rail adhesion coefficient in the range of about 30 to about 35%.

A simple, small, low-cost locomotive is disclosed for applications that larger locomotives are poorly suited and that can be built from an abundant source of surplus parts that are relatively cheap. The locomotive can be built, in part, from serviceable used parts from one or more other locomotives. A principal part that is used in this new locomotive configuration is a single, used, 3-axle locomotive truck assembly. Because of its size, the industrial locomotive can compete in the railcar mover market where even railroad switcher locomotives are too big. In the railcar mover market, the industrial locomotive discussed herein, in spite of its lesser mobility, would be favored because of its ability to handle more cars, its robustness and low cost of ownership.

The approach of using a single reclaimed locomotive truck in a new locomotive build fills a longstanding but unmet need. Locomotive trucks are usually applied in pairs and are designed to swivel to accommodate track curvature as the locomotive negotiates curves. A small locomotive with a relatively short wheel base does not require swiveling trucks for accommodating truck curvature.

Locomotives having only two or three axles are not new but they are relatively unusual in North America. Where locomotives have used only two or three axles, their axles and the accessory parts to the axles have attached directly to the locomotive car frame without a separate assembly, such as the locomotive truck.

The truck assembly is used by the present locomotive in a way the truck assembly was never designed to operate; that is, the truck assembly is used as an "adapter" for all of the components that have been attached to the locomotive's frame in other two- or three-axle locomotives. This attachment may be done in a rigid fashion without any movement between the locomotive car frame and truck frame or in a way that will allow limited movement between the frames. In the latter configuration, this movement could be controlled with a spring suspension system consisting of metal or elastomer springs.

The following definitions are used herein:

Adhesion is a measure of the resistance of friction to slippage between two parallel planes. In the case of a locomotive rail wheel, the parallel plane is the point on the steel rail wheel where the rail wheel contacts the steel rail. The maximum force or pull that a locomotive can generate in order to pull a train is limited by the weight of the locomotive and the amount of adhesion that it can maintain without wheel slippage.

A bolster is a structural component connecting a locomotive truck assembly to the frame of a locomotive so as to allow limited swivelling, vertical, transverse and/or longitudinal movements of the truck assembly with respect to the locomotive car frame to allow, for example, a locomotive with more than one truck assembly to negotiate curves and grades.

A burden car is a single car that carries cargo and provides its own propulsion.

A cabless locomotive is a locomotive not having a functional operator's enclosure or cab. In a functional operator's cab, the locomotive may be operated with protection from outside weather, noise and fumes. In a functional operator's cab, the operator has available at least throttle controls, braking controls and locomotive status displays. A cabless locomotive may not have an operator's cab or it may have the cab windows blacked out and the door locked to render the cab unuseable.

A driver (or driven) axle is a rotating axle that transmits power from the propulsion system to the rails. A driver may refer to an axle or a wheel.

Dynamic braking is typically implemented when the electric propulsion motors are switched to generator mode during braking to augment the braking force. The electrical energy generated is typically dissipated in a resistance grid system. Dynamic braking can also be accomplished using pneumatics or hydraulics.

An energy storage system refers to any apparatus that acquires, stores and distributes mechanical or electrical energy which is produced from another energy source such as a prime energy source, a regenerative braking system, a third rail and an overhead wire and any external source of electrical energy. Examples are a battery pack, a bank of capacitors, a compressed air storage system and a bank of flywheels.

An engine refers to any device that uses energy to develop mechanical power, such as motion in some other machine. Examples are diesel engines, gas turbine engines, microturbines, Stirling engines and spark ignition engines.

An idler axle is a rotating axle that is not powered. An idler may refer to an axle or a wheel.

A prime power source refers to any device that uses energy to develop mechanical or electrical power, such as motion in some other machine. Examples are diesel engines, gas turbine engines, microturbines, Stirling engines, spark ignition engines or fuel cells.

Spotting means moving a rail car or cars into their desired positions.

A traction motor is a motor used primarily for propulsion such as commonly used in a locomotive. Examples are an AC or DC induction motor, a permanent magnet motor and a switched reluctance motor.

Tractive effort is the force applied by the driving wheels parallel to the track. Tractive effort is a synonym of tractive force, typically used in railway engineering terminology when describing the pulling power of a locomotive. The tractive effort provided by a particular locomotive varies depending on speed and track conditions, and is influenced by a number of other factors.

A truck assembly supports the weight of the locomotive, provides the propulsion, suspension and braking. (Outside of North America, a truck assembly is known as a bogie assembly.) Traction motors, typically one on each driving axle, provide propulsion to the wheels. The weight of the locomotive typically rests on a bolster which allows the trucks to pivot so the locomotive can negotiate a curve. Below the bolster, there is typically a leaf spring that rests on a platform suspended by metal links. These links allow the locomotive to swing from side to side. The weight of the locomotive rests on the leaf springs, which compress when the locomotive passes over a bump. This isolates the body of the locomotive from the bump. The links allow the trucks to move from side to side with fluctuations in the track. The system also keeps the amount of weight on each rail relatively equal, reducing wear on the tracks and wheels. Braking is provided by various mechanisms on the trucks. A locomotive typically comprises a body supported near its opposite ends on a pair of truck assemblies (sometimes called bogies). The body includes a main frame or platform, a superstructure, and various systems, subsystems, apparatus and components that are located in the superstructure or attached to the platform. Each truck assembly includes a frame and two or more axle-wheel sets supporting the frame by means of journals near opposite ends of each axle. In addition, a truck assembly typically includes a floating bolster or centerplate between the truck frame and a cooperating load-transmitting pin on the underside of the platform. Each locomotive truck may also include two or more electric traction motors, one per axle-wheel set. Each motor is hung on an axle inboard with respect to the associated wheels, and its rotor is mechanically coupled via torque amplifying gearing to that axle. A three-axle truck can be of either symmetrical or asymmetrical construction. If the center axle were located midway between the other two, the truck would be symmetric; if not, it would be asymmetric.

A truck side bearing is a plate or block, roller or elastic unit fastened to the top surface of a truck bolster on both sides of the center plate and functioning in conjunction with a body side bearing to control the relative movement between the truck assembly and the locomotive car body when there are variations in the track.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIGS. 9a-b show a schematic of possible truck-frame bolsterless connection system for small locomotives.
FIGS. 10a-b show a schematic of possible truck-frame bolster connection system for small locomotives.
FIGS. 11a-b show a prior art bolster bearing plate arrangement.

DETAILED DESCRIPTION

Prior Art

Figure 1:
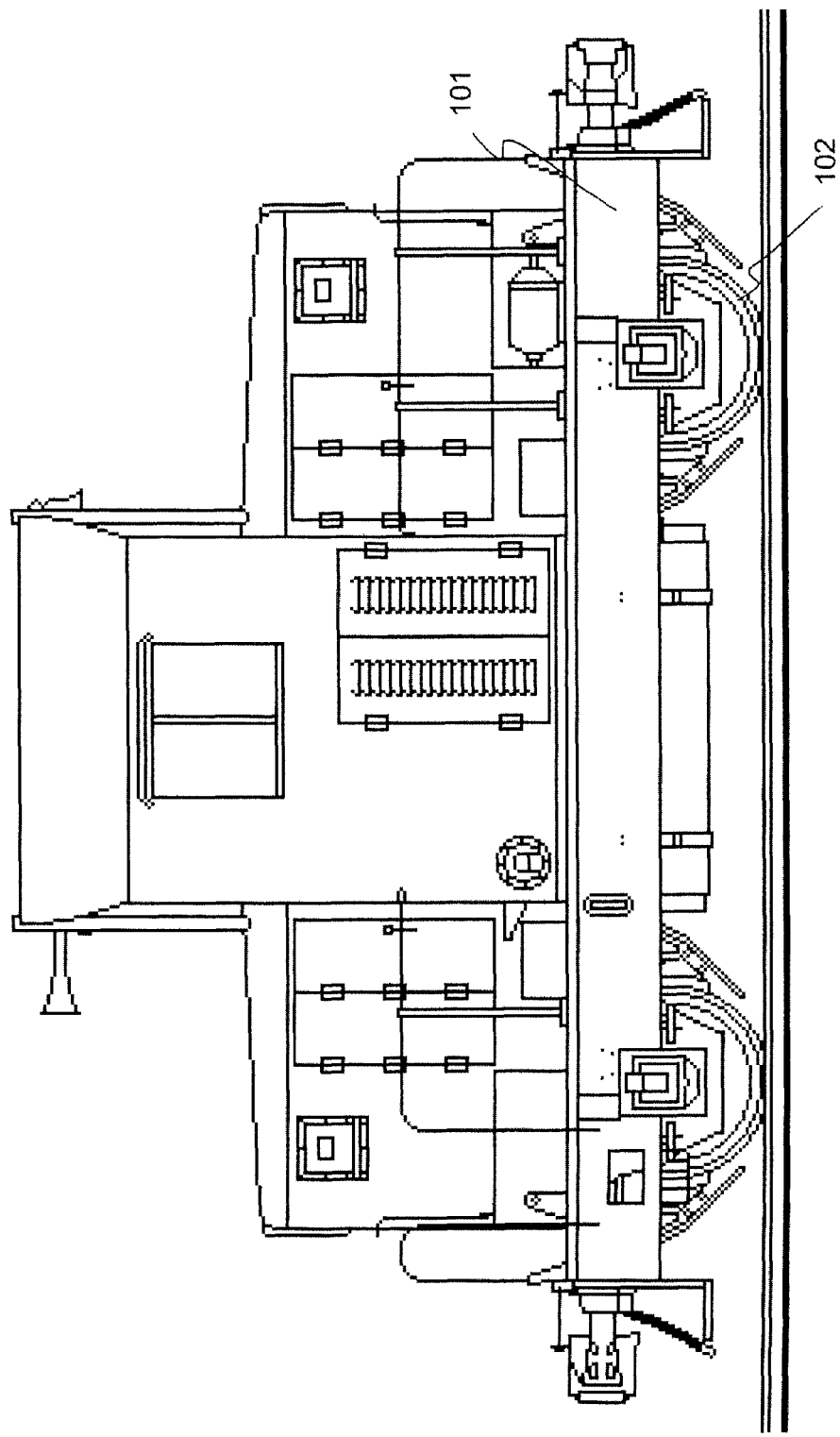
FIG. 1 shows a typical prior art small industrial locomotive without a truck.

FIG. 1 shows a typical prior art small industrial locomotive without a truck. The wheel and axle assemblies 102 are typically attached directly to the frame 101 of the locomotive. Thus, there is no ability of the wheel and axle assemblies 102 to swivel when the locomotive negotiates a curve. There is also limited suspension to absorb shocks from bumps or deviations of the rails. Since these locomotives are usually operated at low speeds, the limited suspension system is not a major liability. Small industrial locomotives, not counting used switcher or line-haul locomotives, typically have two to four axles and a rated horsepower in the range of approximately 200 HP to about 600 HP.

Figure 2:
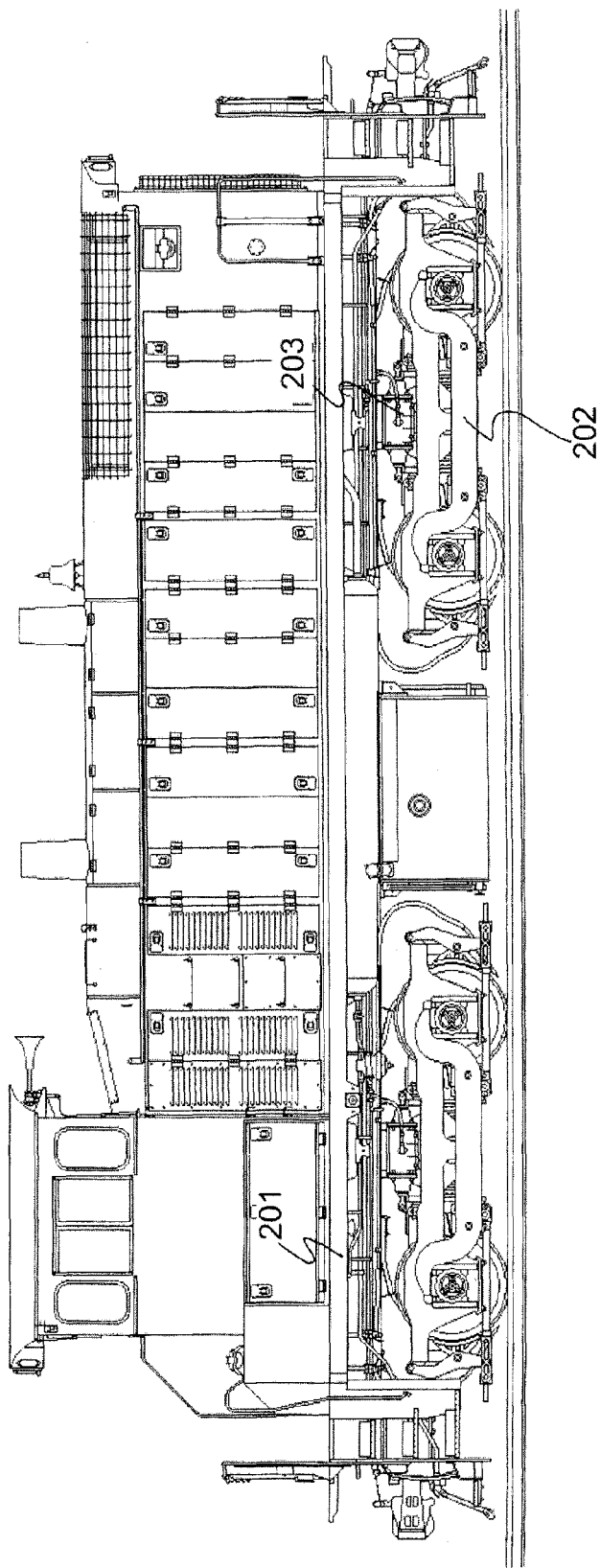
FIG. 2 shows a typical prior art switcher locomotive.

FIG. 2 shows a typical prior art switcher locomotive illustrating a pair of two-axle truck assemblies 202 attached to the locomotive car frame 201 by bolsters 203. The bolsters 203 allow the trucks to swivel as the locomotive negotiates a curve. The switcher typically has a traction motor on each axle. The switcher therefore can have a total of four traction motors mounted on four driving axles for applying maximum tractive effort. Switcher locomotives typically have a pair of two-axle trucks and a rated horsepower in the range of approximately 600 HP to about 1,500 HP.

Figure 3:
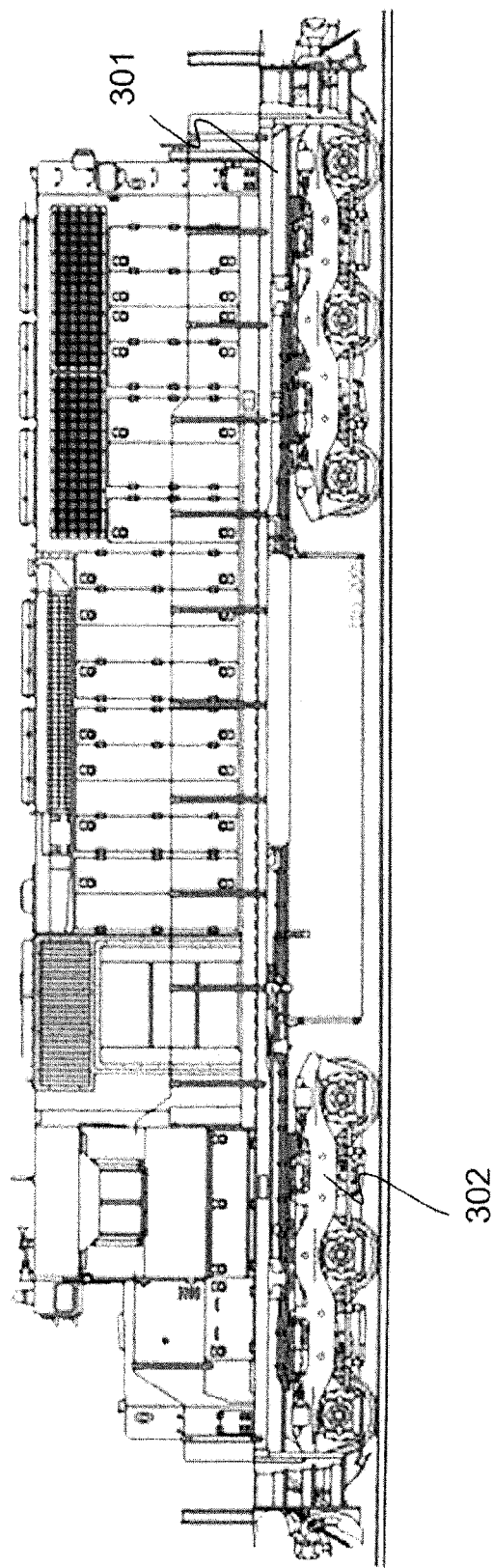
FIG. 3 shows a typical prior art line-haul locomotive.

FIG. 3 shows a typical prior art line-haul locomotive illustrating a pair of three-axle truck assemblies 302 attached to the locomotive car frame 301 by bolsters (not visible but similar to those shown in FIG. 2). The locomotive typically has a traction motor on each axle. The locomotive therefore can have a total of six traction motors mounted on three driving axles for applying maximum tractive effort. Line-haul locomotives typically have a pair of two-axle trucks or a pair of three-axle trucks and a rated horsepower in the range of approximately 1,500 HP to about 6,000 HP.

Figure 4:
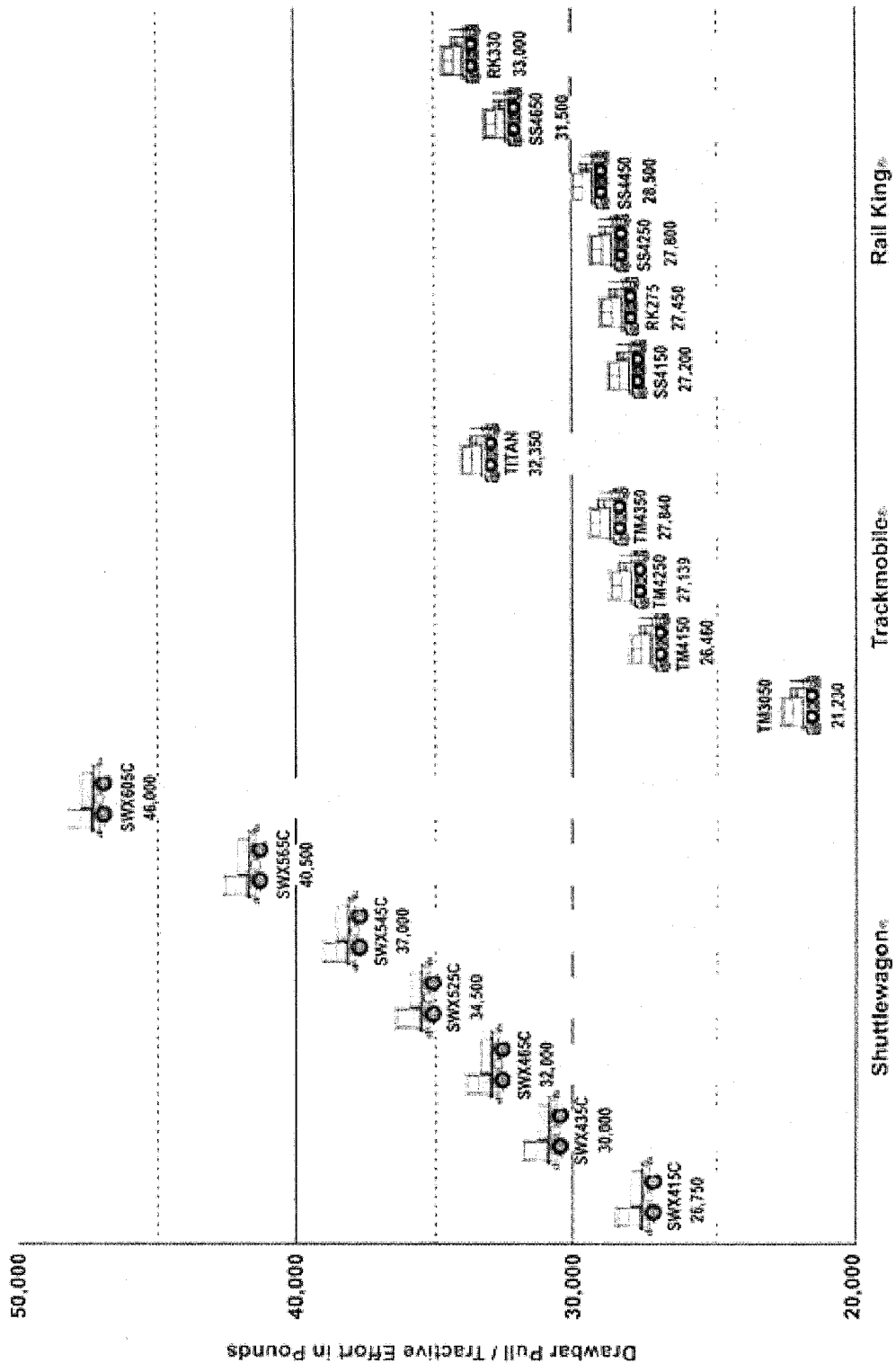
FIG. 4 shows tractive effort for various rail car movers.

FIG. 4 shows maximum tractive effort for various rail car movers. Most rail car movers can generate a maximum tractive effort in the range of about 20,000 lb to about 40,000 lb. The Shuttlewagon SWX605C™ generates about 46,000 lbs tractive effort. The locomotive of the present invention is therefore typically capable of operating near the high end of rail car mover tractive effort range. If the locomotive of the present invention is ballasted with the additional 30 tons, its tractive effort would be in the range of about 25,000 lbs to about 65,000 lbs (30% to 35% adhesion), substantially exceeding the range of competing rail car movers.

Figure 5:
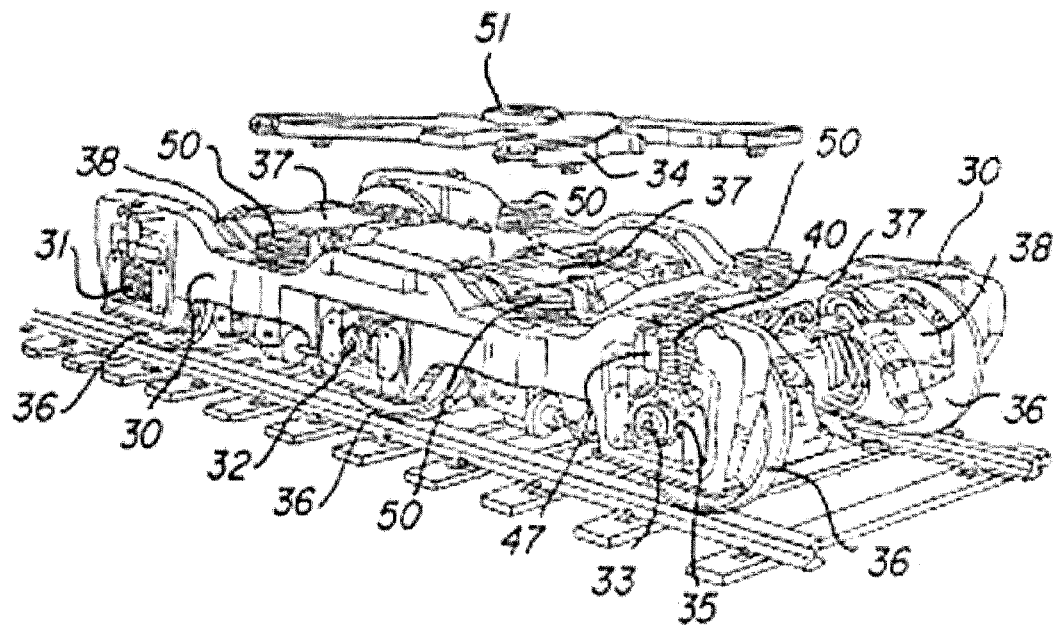
FIG. 5 shows a prior art truck assembly.

FIG. 5 shows a prior art truck assembly taken from U.S. Pat. No. 4,793,047 "Method of Adjusting the Distribution of Locomotive Axle Loads". As is shown in FIG. 4 (the description of which is taken from that of FIG. 2 of U.S. Pat. No. 4,793,047), each truck assembly comprises a strong metal frame 30, three parallel axle-wheel sets 31, 32, and 33, and a floating bolster 34. Each axle-wheel set supports the frame by means of a pair of conventional journals located in housings 35 near opposite ends of the axle on the outboard sides of the associated wheels 36. Axle-hung electric traction motors 37 are disposed between the wheels of the respective axle-wheel sets, and the rotor of each motor is mechanically coupled to the associated axle-wheel set by gearing housed in a gear box 38. In a conventional manner, the traction motors associated with the front and middle axles 31 and 32 are located to the rear of these axles, respectively, whereas the traction motor associated with the rear axle 33 is located to the front thereof.

The primary suspension system of each truck comprises twelve dual, concentrically nesting, vertical helical springs (sometimes called coil springs) arranged in six sets of two each, with the springs in each set being disposed in compression between a spring seat on top of a separate one of the axle journal housings 35 and a cooperating pocket in a side channel of the frame 30. The outboard wall of one such pocket has been cut away in FIG. 5 to reveal a typical pair 40 of these nesting springs. A shock absorber or "snubber" 47 is connected in parallel with at least one set of axle springs on each side of the truck assembly.

The secondary suspension system of each truck comprises four rubber bolster mounts 50 which are respectively seated on pads located on top of the inter-axle sections of the two side channels of the truck frame 30. These bolster mounts support the bolster 34 at load points near the four corners thereof. FIG. 5 shows the bolster 34 detached from the rest of the truck assembly so as to expose the four bolster mounts 50. Each bolster mount comprises a unitary stack of curved rubber pads interleaved with correspondingly curved steel plates. The rubber pads are relatively soft horizontally and will deflect in shear to permit a controlled amount of lateral motion between opposite ends of the bolster mount, which motion is accompanied by a slight extension or contraction of the mount. The rubber pads are sufficiently stiff in the vertical plane to prevent undesirable tilting of the truck frame.

In the middle of each floating bolster 34 there is a circular plate 51 adapted to receive one of a pair of large diameter bearing pins or bosses on the underside of the locomotive car body near opposite ends of the platform 11. The static weight of the locomotive car body is transmitted via such pins to the centers of the respective bolsters on the truck assemblies. This cooperating bearing pin and center plate arrangement permits each truck assembly to swivel with respect to the locomotive car body as the wheels 36 negotiate a curved section of track.

Preferred Truck Assembly

Figure 6:
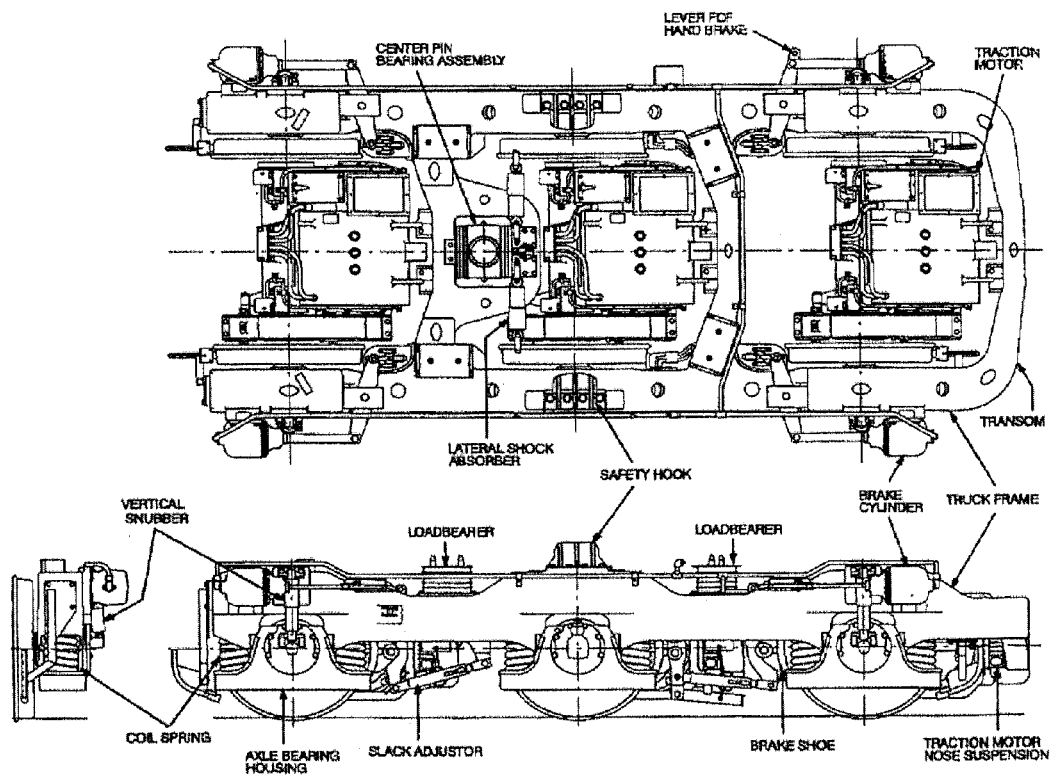
FIG. 6 shows a schematic of a prior art bolsterless three axle truck assembly illustrating various suspension components and traction motors.

For reference, FIG. 6 shows a schematic of a prior art bolsterless three axle truck assembly illustrating various suspension components, braking system components and traction motors. This truck assembly includes all the suspension components and many of the propulsion components (specifically three traction motors) required for a robust, high powered industrial locomotive.

Present Invention

Figure 7:
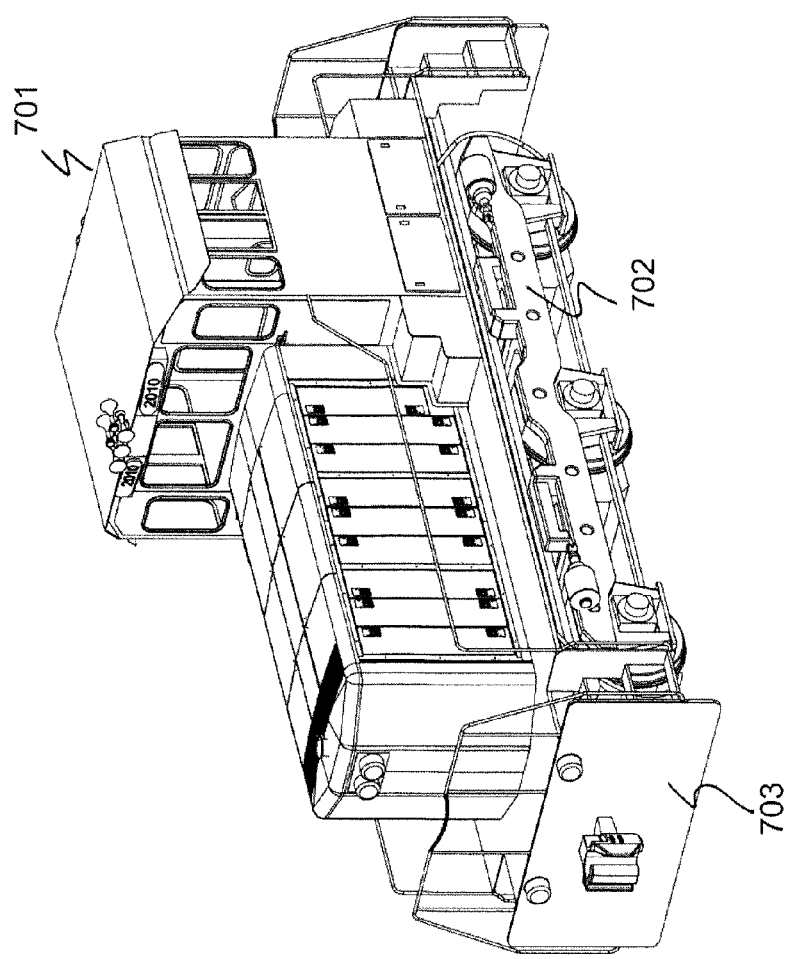
FIG. 7 shows an isometric view of a locomotive with the principal elements of the present invention.

FIG. 7 shows an isometric view of a locomotive with the elements of the present invention. A locomotive car body with integral frame, cab and hood 701 is shown attached to a 3-axle truck assembly 702. Also shown is front pilot plate 703. There is also typically a rear pilot plate (partially visible at the rear).

Figure 8:
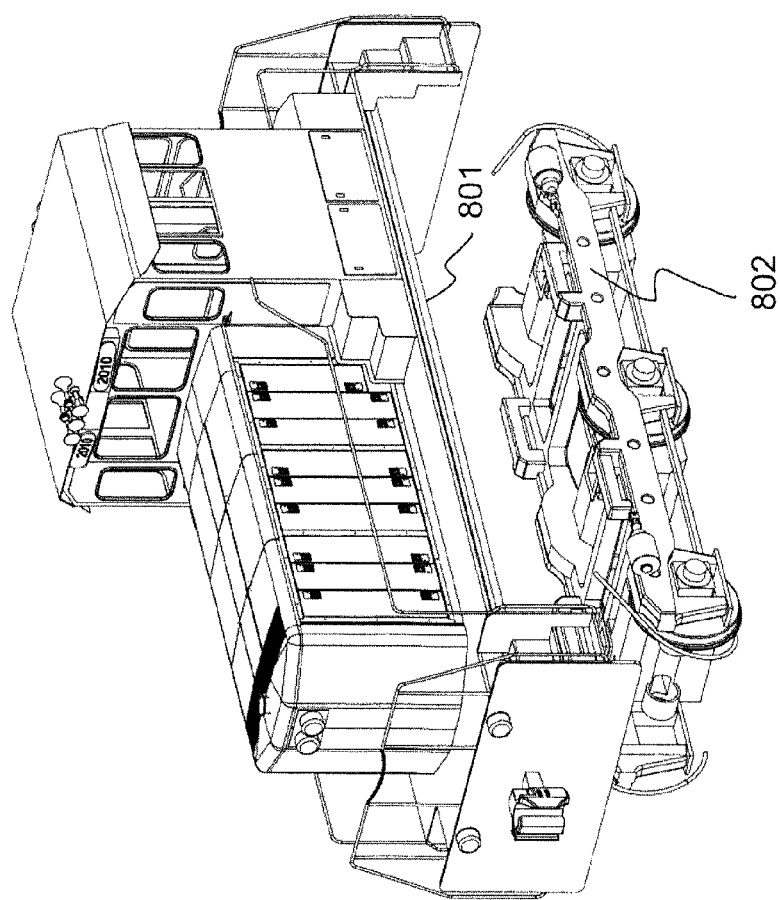
FIG. 8 shows an exploded isometric view of a locomotive with the principal elements of the present invention.

FIG. 8 shows an exploded isometric view of the locomotive of FIG. 7 also illustrating the principal elements of the present invention. This figure illustrates a locomotive car frame 801 and a 3-axle truck assembly 802 before being mated. The frame 801 can be, for example, a modified Special Duty ("SD") locomotive car frame with a "cab-end switcher" type cab. In this example, 28 feet of the original SD donor locomotive would be used with stairs, couplers, draft gears, and miscellaneous other parts to form the new frame. The weight of this locomotive without any additional ballast would be about 60 tons and would develop a starting tractive effort of about 36,000 lbs to about 42,000 lbs (30% to 35% adhesion). Within the center sill of this new frame, there is a space to add up to another approximately 30 tons of steel ballast. The truck assembly is one of the two truck assemblies from an SD locomotive.

Attachment

Direct Attachment

In one configuration, the locomotive car frame may be attached to the truck assembly by welding, by using heavy duty bolts, by using a rigid attachment plate, or by any well-known method of direct attachment that does not allow motion between the locomotive car frame and truck assembly. In other words, the locomotive car frame would be rigidly attached to the truck assembly to maintain the interface therebetween substantially free of relative motion or to maintain the locomotive car frame substantially stationary relative to the truck assembly. It is necessary for the direct attachment to be by means of bolting so that the locomotive car frame can be readily removed from the truck assembly for maintenance on, for example, the traction motors.

Modified Bolster Attachment

Another means of direct attachment using a bolster type truck would be to replace the floating bolster 34 of FIG. 5 with a specially fabricated bolster that would match all the points of contact of the original floating bolster with the truck assembly and would be easily attachable to the underside of a locomotive car frame. This new bolster would be similar to floating bolster 34 of FIG. 5 but would not have the circular plate 51 of FIG. 5 as the means of connection to the locomotive car frame. Thus, instead of connecting the truck assembly to the locomotive car frame with a center bearing that allows rotational movement, this new bolster would be designed for direct connection on its upper side to the bottom of the locomotive car frame without any relative rotational movement. In other words, the locomotive car frame would be rigidly attached to the truck assembly to maintain the interface therebetween substantially free of relative rotational movement or to maintain the locomotive car frame substantially nonrotational relative to the truck assembly.

Bolsterless Attachment

FIGS. 9*a*-*b* show a schematic of possible truck-frame bolsterless connection system for the small locomotive of the present invention. As shown in a side view of FIG. 9*a*, locomotive car frame 901 rests on a truck frame 902 by bearing on four or more large elastomer springs 903. The springs 903 are held in position against lateral motion by cylinders 904. Cylinders 904 allow a limited amount of vertical motion so that the locomotive can absorb some shock from bumps, undulations or deviations in the rails. The weight of the locomotive car frame 901 holds the locomotive car frame 901 in substantial contact with the truck frame assembly 902. A large steel block or cylinder 905 carries the longitudinal load of the locomotive (whose couplers are attached to the locomotive car frame 901) and transmits the longitudinal load to the truck frame 902 when the locomotive is pushing or pulling cars. The steel block or cylinder 905 is connected to either but not both the locomotive car frame 901 and the truck assembly 902 and is free to move vertically in response to movement of springs 903.

FIG. 9*b* is a top view looking down on the locomotive car frame 911 and shows the approximate location of four elastomer spring assemblies 912 and the steel load transmitting pin 913. A bolsterless attachment system such as shown in the example of FIG. 9 is a more preferable means of attachment of the locomotive car frame to the truck assembly than the direct attachment method described above.

Using the bolsterless attachment method of attaching the truck assembly to the locomotive is not limited to bolsterless type trucks. It can be seen in FIG. 5 that, by removal of the floating bolster 34, by modification of the bolster mounts 50 and by adding a means of limiting longitudinal and lateral movement, the bolster type truck can be converted into essentially a bolsterless type truck.

Simple Bolster

In another configuration, the locomotive car frame can be attached to the truck assembly by a coupling system that allows limited swiveling, vertical, transverse and/or longitudinal movements of the truck assembly with respect to the locomotive car frame.

When the locomotive is pushing other rail cars, it has a tendency to "jack-knife," (1) because of the swing in the couplers between the locomotive and the rail car it is coupled to and (2) because of the freedom of rotary movement between the locomotive and its truck. If too much freedom of rotational movement is allowed between the locomotive and its truck, there would need to be some sort of mechanism that would correct its orientation if it were sitting askew. This twisting could happen after a "push" or going down the track without something in tow.

FIGS. 10*a-b* show a schematic of possible truck-frame connection system for small locomotives which would avoid the tendency to jack knife yet give the locomotive some suspension and some ability to swivel and move vertically or longitudinally. FIG. 10*a* shows a side view where a, typically steel, annular cylinder 1003 is rigidly attached to the frame 1002 of a truck assembly. A, typically solid steel, central cylinder 1004 is rigidly attached to the frame 1001 of a locomotive. When the locomotive car frame is mated to the truck assembly, the central cylinder 1004 rests on a hard rubber, urethane or other elastically deformable material 1005 and is held in place by the weight of the locomotive car frame. Locomotive car frame 1001 may move vertically with respect to truck assembly frame 1002 as the material 1005 deforms elastically. The same or another elastically deformable material 1006 separates annular cylinder 1003, which is rigidly attached to truck frame 1002, from central cylinder 1004, which is rigidly attached to locomotive car frame 1001. Locomotive car frame 1001 may move laterally or swivel with respect to truck assembly frame 1002 as the material 1006 elastically deforms. While the cylinders discussed above are shown as being cylindrical, it is to be understood that any shape of cylinder may be employed, such as elliptical, oval, rectangular, polygonal, and the like.

FIG. 10*b* is a top view of the simple bolster system showing annular cylinder 1003, solid cylinder 1004 and elastically deformable material 1006. Members 1011 and 1013 are rigidly attached to annular cylinder 1003 and are not attached to solid cylinder 1004. Members 1012 and 1013 are rigidly attached to solid cylinder 1004 and are not attached to annular cylinder 1003. This arrangement allows the truck assembly to swivel with respect to the locomotive car frame assembly by elastically deforming material 1006 but it only allows limited swiveling movement.

FIGS. 10*a-b* are examples of a simple bolster system that can be used on a locomotive assembled from a separate locomotive car frame and truck assembly of the present invention. As can be appreciated, more than one of these bolster assemblies can be used. It is also noted that material 1005 can be replaced by a stiff steel spring or spring assembly.

FIGS. 11*a-b* show a prior art bolster bearing plate arrangement. FIG. 11*a* shows a truck bolster frame 1101 with 4 side bearing plates 1102. FIG. 11*b* shows a detail of a truck side bearing plate 1111 and the position of a matching locomotive car frame side bearing plate 1112. Typical clearance between the bearing plates 1111 and 1112 is from about ¹⁄₃₂ inches to about ⁵⁄₁₆ inches.

The simple bolster type truck assembly may be applied, with minimal modification, to the locomotive car frame to provide an advantage over the other previous described methods of attachment. This is because of the compatibility of a standard, more commonly available type of locomotive truck assembly. This can be accomplished using the truck's frame along with its spaced side bearing plates. Matching side bearing plates would be attached to the locomotive car frame. In addition, matching end bearing plates may optionally be added to both the truck assembly and the locomotive car frame. The side bearing plates would control excessive side to side rocking (tilting) and swivelling. The end bearing plates would check excessive back and forth tilting. At least one set of bearing plates would require a stop to limit rotational, rocking or jack knifing. A stop might consist of a strip welded onto each side of one of the matching bearing plates. A potential advantage of a three axle truck assembly is that it is long enough that end bearing plates may not be necessary.

In the above modified bolster, bolsterless and simple bolster attachment methods, it may be necessary to relocate the center bearing a small distance towards the front or rear of the locomotive car body in order to achieve a better balance of the locomotive car body on the truck assembly. The center bearing is typically attached to the underside of the locomotive car body and engages the bolster which is typically at the center of the truck assembly as shown, for example, in FIG. 11*a*.

Self-Elevating Configuration

Figure 12:
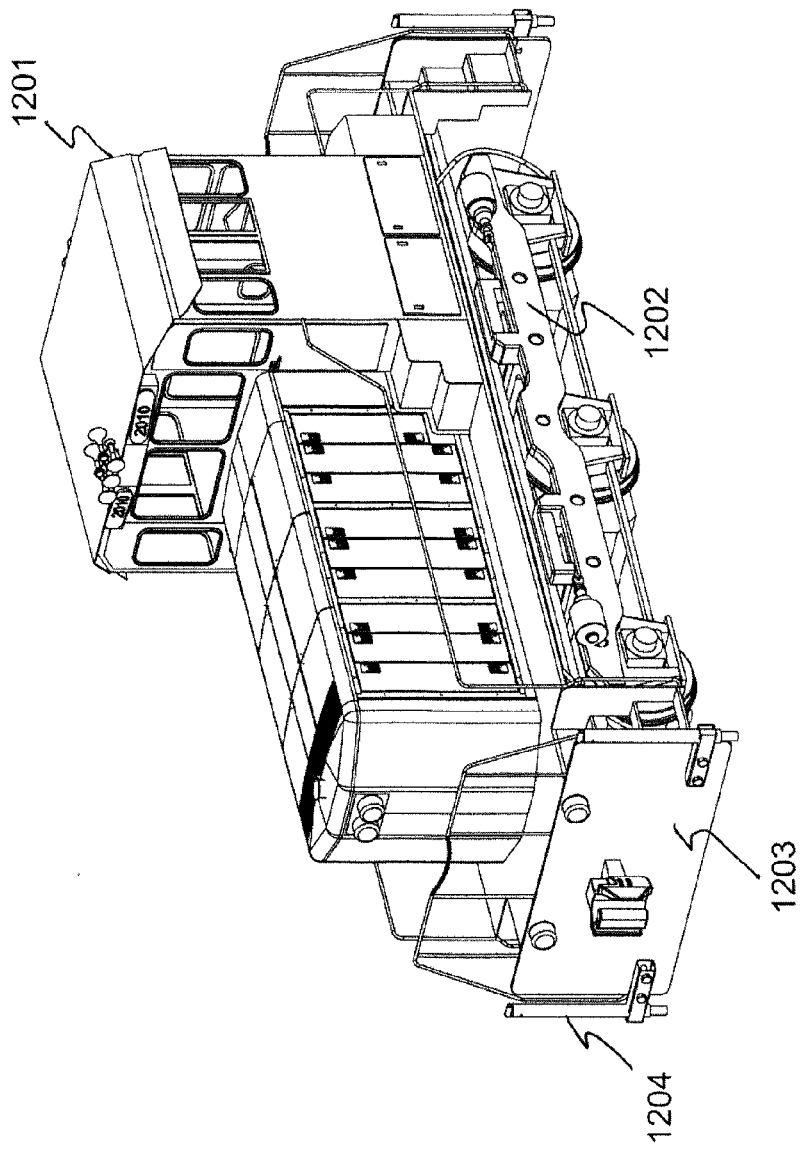
FIG. 12 shows an isometric view of a locomotive with the principal elements of the present invention including a self-jacking system.

FIG. 12 shows an isometric view of a locomotive with the principal elements of the present invention including a self-elevating (or self-jacking) system. A locomotive car body with integral frame, cab and hood 1201 is shown attached to a 3-axle truck assembly 1202 as is also shown in FIG. 7. In this configuration, there are four hydraulic cylinders 1204 attached on the corners of the front and rear pilot plates 103. The hydraulic cylinders 1204 are shown in retracted position where they are easily installed for maintenance procedures that involves truck assembly removal. As can be appreciated, the jacks may also be mechanical jacks such as, for example, screw jacks.

Figure 13:
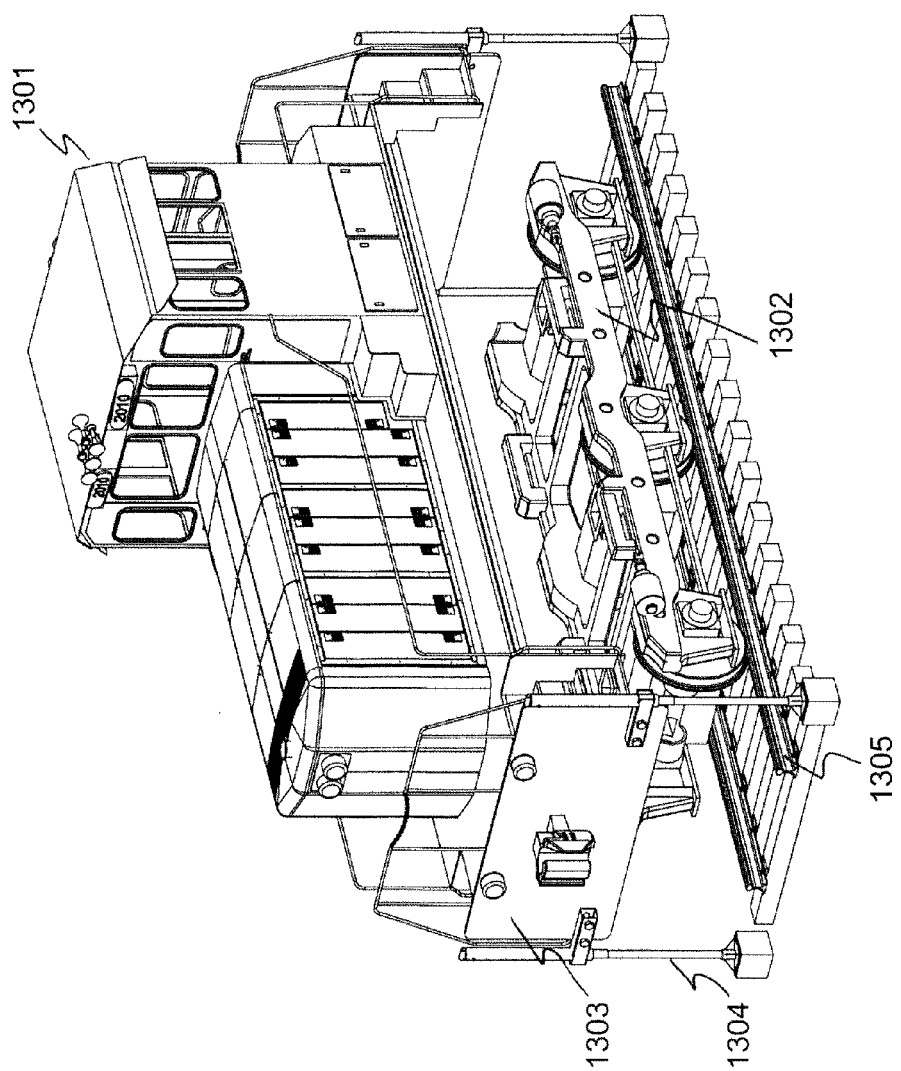
FIG. 13 shows an exploded isometric view of a locomotive with the principal elements of the present invention including a self-jacking system.

FIG. 13 shows an exploded isometric view of a locomotive with the principal elements of the present invention including a self-jacking system. This figure illustrates a locomotive car frame 1301 and a 3-axle truck assembly 1302 before being mated, as is also shown in FIG. 8. Here four hydraulic jacks 1304 are shown fully extended, lifting locomotive car body 1301 sufficiently above truck assembly 1302 so that truck assembly 1302 can be rolled out from under locomotive car body 1301. The hydraulic jacks 1304 are typically about 3-inches in diameter, and the four jacks are capable of lifting about 40 tons. As can be appreciated, there may be more than four jacks. The advantage of this self-jacking system is that maintenance or repairs to the truck assembly and its traction motors can be made anywhere and does not require a crane to lift the locomotive car body off the truck assembly.

Figure 14:
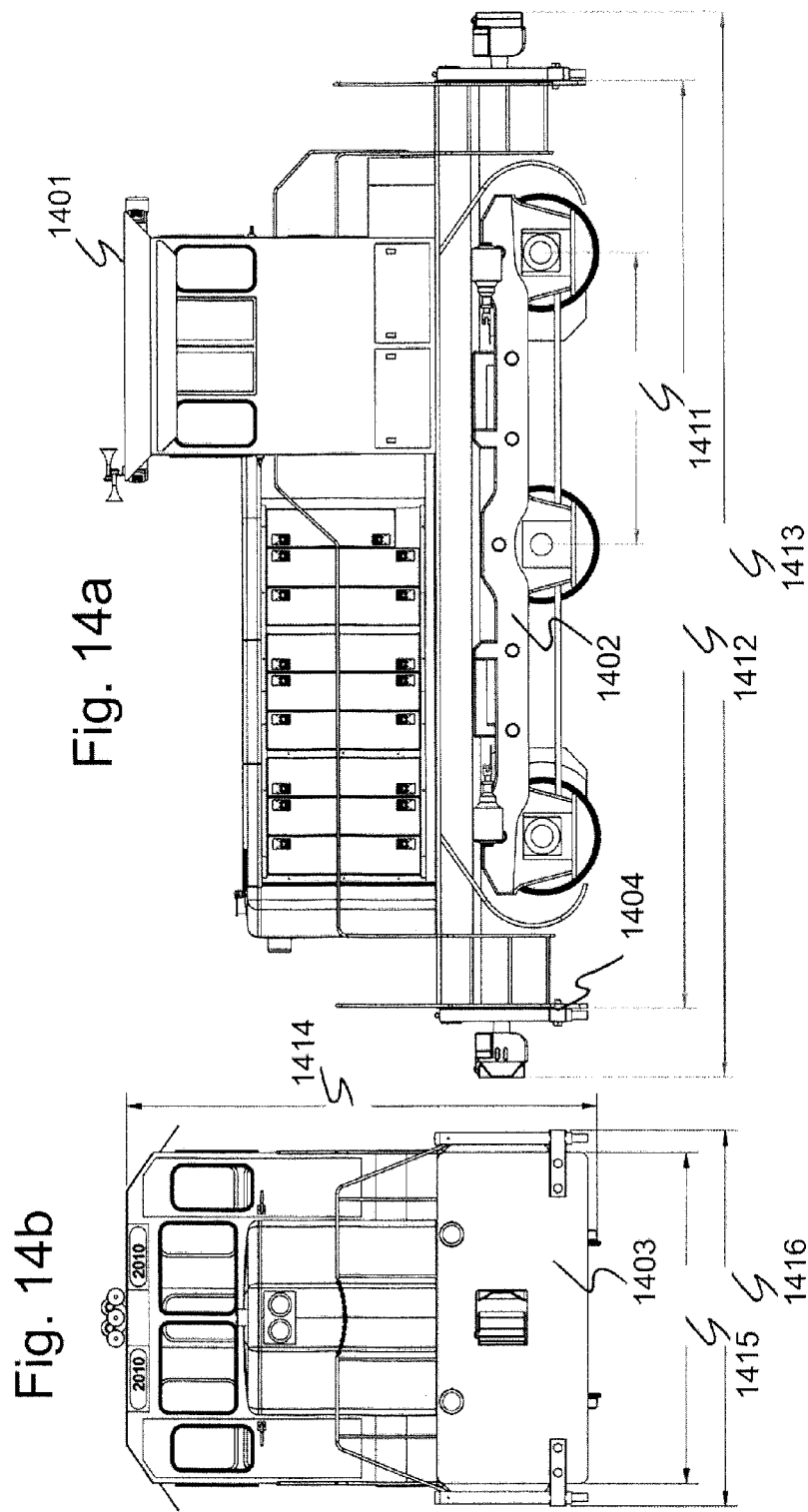
FIGS. 14a-b show a schematic front and side view of a locomotive with the principal elements of the present invention including a self-jacking system.

FIGS. 14*a-b* show a schematic front and side view of a locomotive with the principal elements of the present invention including a self-jacking system. FIG. 14*a* is a side view showing a locomotive car frame 1401, a truck assembly 1402 and hydraulic cylinders 1404 mounted on the front and rear pilot plates. The overall length 1413 of this example locomotive (coupler to coupler) is about 32 feet. The length 1412 from front to rear jacking cylinders is about 28 feet. The typical center to center separation 1411 of wheels on the truck assembly is about 8.5 feet. FIG. 14*b* is a front view of the locomotive. The height 1414 of the locomotive measured from the rails is about 14 feet. The width of the locomotive 1415 as determined by the front pilot plate 1403 is about 10 feet. The width of the locomotive 1416 including the hydraulic jacking cylinders is about 11.5 feet in this example.

Cabless Configuration

Figure 15:
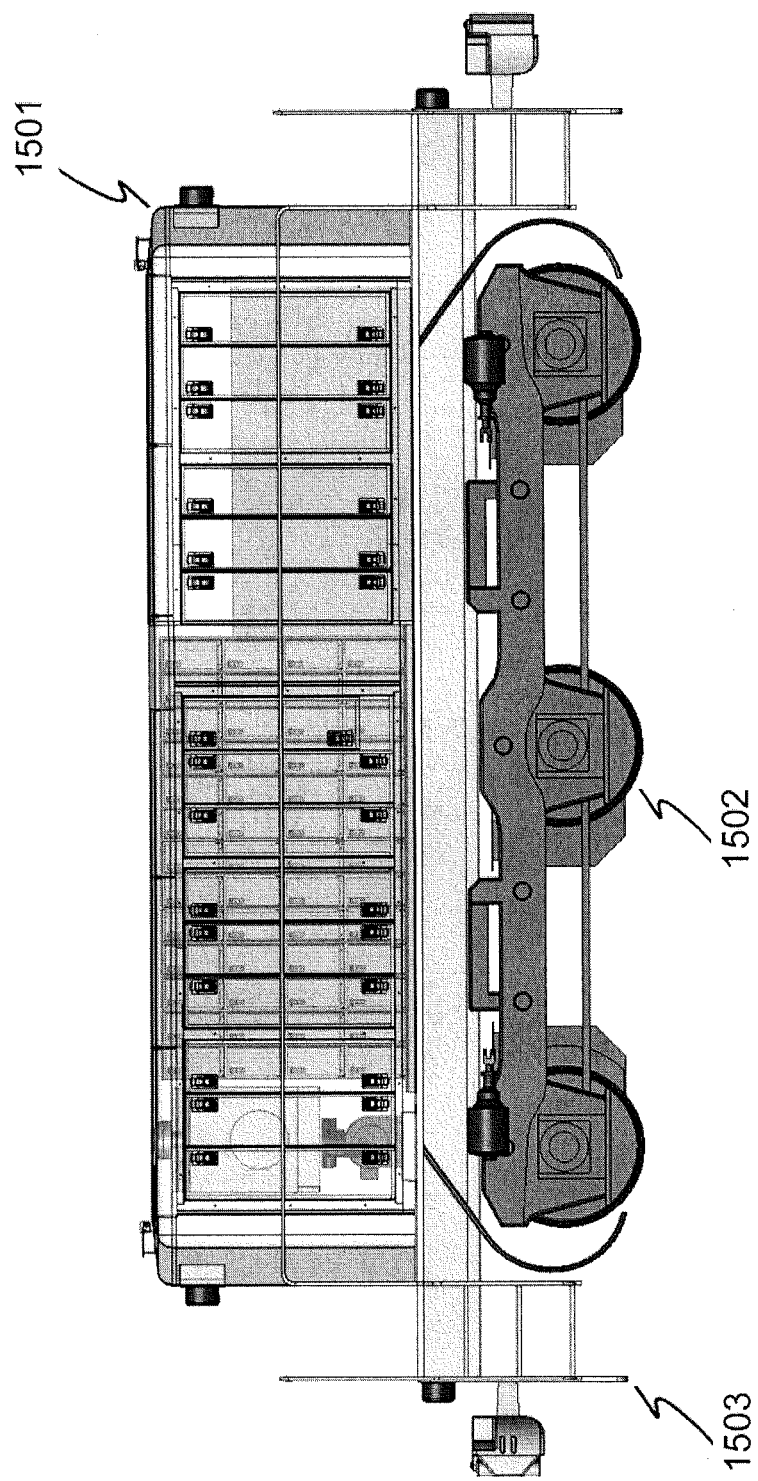
FIG. 15 shows a schematic side view of a cabless locomotive of the present invention that can operated by be remote control.

FIG. 15 shows a schematic side view of a cabless locomotive of the present invention that can operated by be remote control. A locomotive car body with integral frame and hood 1501 is shown attached to a 3-axle truck assembly 1502. In this configuration, there are four hydraulic cylinders 1503 attached on the corners of the front and rear pilot plates.

The cabless locomotive can be independently operable by an operator: on foot; in a vehicle not connected to the train being pulled by the cabless locomotive; or in a building or in any other remote location in communication with the locomotive. In this case the operator would control the cabless locomotive of the present invention by any number of remote control techniques, such as for example, a belt controller unit worn by the operator, a radio telemetry unit, a wireless unit such as a computer or cellular phone, an optical link or any other commonly known means of communication. The operator may also have a video linkage to the locomotive such as for example by cameras located on the locomotive or any of the cars being moved. The cameras which are located on such a train would be in communication with the remote location where the operator is situated. In another embodiment, the cabless locomotive can be operated in fully automated mode under the partial or full direction of a computer program. Such operation is preferred in operations that are repetitive and/or in dangerous areas such as radioactive mining or waste storage.

Locomotive Power Plants

The locomotive can have a number of power plant configurations. For example, the locomotive can be powered by a diesel or gasoline powered engine with a rated maximum power in the range of about 250 to about 750 HP.

Alternately, the locomotive can be powered by a gas turbine engine operating on any number of fuels such as diesel, natural gas, methanol, butanol, hydrogen or one of the biofuels. The gas turbine would be in the same power range as the diesel engines described above. In the case of a gas turbine engine, the locomotive may be configured to use two or more fuels, either separately of simultaneously.

It is also feasible that the locomotive of the present invention can have a hybrid power plant consisting of a smaller diesel or gas turbine engine and a battery pack. A typical hybrid power plant might be comprised of an engine in the power range from about 50 to about 250 kW and a battery pack with a capacity range from about 150 to about 500 kW-hrs. When operated together for maximum power, such a hybrid power plant can have a maximum power output up to about 500 kW. The battery pack is preferably a lead acid battery pack but other battery types such as lithium batteries may be used.

Other variations of hybrid power plants include a plug-in hybrid or an electrically powered locomotive whose battery pack is charged from grid power obtained from an overhead catenary.

A number of variations and modifications of the inventions can be used. As will be appreciated, it would be possible to provide for some features of the inventions without providing others.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of using a locomotive, the method comprising:
   providing a locomotive, the locomotive comprising:
   a locomotive car body;
   a prime power source; and no more than one truck assembly operatively engaging the locomotive car body by a bolster, the truck assembly comprising at least two pairs of driving axles, each driving axle engaging at least two wheels, and traction motors in electrical communication with the prime power source to apply tractive effort; wherein the locomotive car body is not directly attached to the truck assembly, wherein the bolster allows at least one of vertical, transverse and longitudinal movement of the truck assembly with respect to the locomotive car body; and operating the locomotive.

2. The method of claim 1, wherein the locomotive car body comprises an integral frame, a cab, and hood covering the prime power source, wherein the truck assembly is a three-axle truck assembly, and wherein the truck assembly comprises a truck frame, lateral and vertical shock absorbers, and a brake assembly.

3. The method of claim 1, wherein the bolster further allows at least one of roll, pitch and yaw movement of the truck assembly with respect to the locomotive car body.

4. The method of claim 1, wherein the bolster inhibits rotational movement of the locomotive car body relative to the truck assembly.

5. The method of claim 4, wherein the bolster is free of a circular plate to engage the locomotive car body.

6. The method of claim 1, further comprising:
a plurality of sets of elastically deformable members to inhibit lateral motion by the respective elastically deformable member and a central cylinder to carry at least most of the weight of the locomotive car body, wherein the central cylinder is attached to only one of the truck assembly and locomotive car body and wherein the central cylinder is free to move vertically in response to movement of an elastically deformable member.

7. The method of claim 1, wherein the locomotive has a tractive effort in the range of about 25,000 to about 65,000 pounds.

8. The method of claim 1, wherein the locomotive has an adhesion coefficient in the range of about 30 to about 35%.

9. The method of claim 1, wherein the locomotive is a cabless locomotive that can be remote controlled by the operator.

10. A method of using a locomotive, the method comprising:
providing a locomotive, the locomotive comprising:
a locomotive car body;
a prime power source;
no more than one truck assembly operatively engaging the locomotive car body, the truck assembly comprising at least three pairs of driving axles, each driving axle engaging at least two wheels, and traction motors in electrical communication with the prime power source to apply tractive effort; and
a connection system for connecting the locomotive car body to the truck assembly, the connection system comprising a plurality of first side bearing plates positioned at either side of the locomotive and attached to the locomotive car body and second side bearing plates positioned adjacent to the first side bearing plates and attached to the truck assembly, whereby the first and second side bearing plates contact one another and restrict side-to-side rocking, tilting, and/or swiveling of the locomotive car body relative to the truck assembly; and operating the locomotive.

11. The method of claim 10, wherein the connection system further comprises first end bearing plates positioned at either end of the locomotive and attached to the locomotive car body and second end bearing plates positioned adjacent to the first end bearing plates and attached to the truck assembly, whereby the first and second end bearing plates contact one another and restrict end-to-end rocking, tilting, and/or swiveling of the locomotive car body relative to the truck assembly.

12. The method of claim 10, wherein the locomotive has a tractive effort in the range of about 25,000 to about 65,000 pounds.

13. The method of claim 10, wherein the locomotive has an adhesion coefficient in the range of about 30 to about 35%.

14. The method of claim 10, wherein the locomotive is a cabless locomotive that can be remote controlled by the operator.

15. A method of using a locomotive, the method comprising:
providing a locomotive, the locomotive comprising:
a locomotive car body;
a prime power source; and
no more than one truck assembly operatively engaging the locomotive car body, the truck assembly comprising at least three pairs of driving axles, each driving axle engaging at least two wheels, and traction motors in electrical communication with the prime power source to apply tractive effort; and
a self-elevating system, the self-elevating system comprising a plurality of extendable and retractable members that extend and retract, whereby, in a first mode, the members are retracted to permit movement of the locomotive and, in a second mode, the members are extended to lift the locomotive car body above the truck assembly to at least one of permit access to the truck assembly and remove the truck assembly from under the locomotive car body; and
operating the locomotive.

16. The method of claim 15, wherein the locomotive has a tractive effort in the range of about 25,000 to about 65,000 pounds.

17. The method of claim 15, wherein the locomotive has an adhesion coefficient in the range of about 30 to about 35%.

18. The method of claim 15, wherein the locomotive is a cabless locomotive that can be remote controlled by the operator.

* * * * *